United States Patent
Petrov et al.

(10) Patent No.: US 11,624,846 B2
(45) Date of Patent: Apr. 11, 2023

(54) MOMENT TENSOR RECONSTRUCTION

(71) Applicant: The Regents of the University of California, Oakland, CA (US)

(72) Inventors: Petr Petrov, Lafayette, CA (US); Gregory A Newman, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 200 days.

(21) Appl. No.: 16/646,944

(22) PCT Filed: Sep. 17, 2018

(86) PCT No.: PCT/US2018/051341
§ 371 (c)(1),
(2) Date: Mar. 12, 2020

(87) PCT Pub. No.: WO2019/060249
PCT Pub. Date: Mar. 28, 2019

(65) Prior Publication Data
US 2020/0264325 A1    Aug. 20, 2020

Related U.S. Application Data

(60) Provisional application No. 62/561,502, filed on Sep. 21, 2017.

(51) Int. Cl.
*G01V 1/00* (2006.01)
*G01V 1/28* (2006.01)

(52) U.S. Cl.
CPC ............ *G01V 1/008* (2013.01); *G01V 1/288* (2013.01); *G01V 2210/1232* (2013.01); *G01V 2210/1234* (2013.01); *G01V 2210/65* (2013.01)

(58) Field of Classification Search
CPC .............. G01V 1/008; G01V 1/288; G01V 2210/1232; G01V 2210/1234; G01V 2210/65
See application file for complete search history.

(56) References Cited

U.S. PATENT DOCUMENTS 5,377,104 A * 12/1994 Sorrells .................. E21B 47/02
                                                               702/11
5,583,825 A * 12/1996 Carrazzone ............ G01V 1/288
                                                               367/83

(Continued)

OTHER PUBLICATIONS

International Search Report dated Dec. 13, 2018 for International Application No. PCT/US2018/051341.

(Continued)

*Primary Examiner* — Manuel A Rivera Vargas
*Assistant Examiner* — Yaritza H Perez Bermudez
(74) *Attorney, Agent, or Firm* — Womble Bond Dickinson (US) LLP (57) ABSTRACT

A seismic monitoring system includes a plurality of seismic monitors and a processing device operatively coupled to the plurality of seismic monitors. The processing device receives recordings of waveforms of motion detected at the plurality of seismic detectors in a geographic area. The processing device applies the respective recordings to corresponding positions of the seismic detectors in a three-dimensional geological model that describes its elastic attributes and tests a plurality of moment tensors at a plurality of locations. Based on the testing, the processing device determines a globally convergent source location and moment tensor in the three-dimensional model based on the testing.

19 Claims, 4 Drawing Sheets

(56) References Cited

U.S. PATENT DOCUMENTS

| | | | | |
|---|---|---|---|---|
| 5,963,508 | A * | 10/1999 | Withers | G01V 1/008 166/250.1 |
| 10,408,052 | B2 * | 9/2019 | Mandal | G01V 1/50 |
| 11,215,722 | B2 * | 1/2022 | Le Calvez | G01V 1/52 |
| 11,227,345 | B2 * | 1/2022 | Sundaresh | G06Q 50/06 |
| 2005/0190649 | A1 * | 9/2005 | Eisner | G01V 1/40 367/38 |
| 2007/0203673 | A1 * | 8/2007 | Sherrill | G01V 1/30 702/14 |
| 2008/0255762 | A1 * | 10/2008 | Carvill | G01V 1/3808 702/18 |
| 2009/0010104 | A1 * | 1/2009 | Leaney | G01V 1/364 367/47 |
| 2009/0303834 | A1 * | 12/2009 | Sengupta | G01V 1/303 702/18 |
| 2011/0222371 | A1 * | 9/2011 | Liu | G01V 13/00 367/13 |
| 2011/0267921 | A1 * | 11/2011 | Mortel | G01V 1/28 367/57 |
| 2012/0116682 | A1 * | 5/2012 | Saenger | G01V 1/28 702/16 |
| 2013/0085731 | A1 * | 4/2013 | De Stefano | G01V 3/081 703/6 |
| 2013/0322212 | A1 * | 12/2013 | Pica | G01V 1/303 367/38 |
| 2014/0102694 | A1 * | 4/2014 | Hargreaves | E21B 49/00 166/250.01 |
| 2014/0226437 | A1 * | 8/2014 | Chambers | G01V 1/36 367/7 |
| 2015/0198028 | A1 * | 7/2015 | Kim | G01V 1/30 702/14 |
| 2015/0346385 | A1 * | 12/2015 | Jin | G01V 99/005 703/6 |
| 2016/0047924 | A1 * | 2/2016 | Krohn | G01V 1/303 703/2 |
| 2016/0097870 | A1 * | 4/2016 | Routh | G01V 1/282 703/2 |
| 2016/0139283 | A1 * | 5/2016 | Kamil | G01V 1/3808 702/17 |
| 2016/0178772 | A1 * | 6/2016 | Carter | G01V 1/42 702/17 |
| 2017/0102470 | A1 * | 4/2017 | Jeremic | G01V 1/288 |
| 2017/0192118 | A1 * | 7/2017 | Du | G01V 1/282 |
| 2017/0199289 | A1 * | 7/2017 | Peng | G01V 1/282 |
| 2017/0242142 | A1 * | 8/2017 | Jiao | E21B 49/00 |
| 2017/0248716 | A1 * | 8/2017 | Poole | G01V 1/364 |
| 2017/0371051 | A1 * | 12/2017 | Raymer | G01V 1/003 |
| 2018/0120464 | A1 * | 5/2018 | Sun | G01V 1/282 |
| 2018/0203144 | A1 * | 7/2018 | Karrenbach | G01D 5/3538 |
| 2018/0275302 | A1 * | 9/2018 | Calderón | G01V 1/364 |
| 2019/0086567 | A1 * | 3/2019 | Hampson | G01V 1/20 |
| 2019/0170889 | A1 * | 6/2019 | Hampson | G01V 1/38 |
| 2019/0187317 | A1 * | 6/2019 | Watts | G01V 1/52 |
| 2020/0018149 | A1 * | 1/2020 | Luo | E21B 47/12 |
| 2020/0158898 | A1 * | 5/2020 | Le Guern | G01V 1/345 |
| 2020/0264325 | A1 * | 8/2020 | Petrov | G01V 1/288 |
| 2020/0292724 | A1 * | 9/2020 | Boiero | G01V 1/3808 |
| 2020/0341159 | A1 * | 10/2020 | Le Calvez | G01V 1/303 |
| 2021/0149066 | A1 * | 5/2021 | Wu | G01V 1/005 |
| 2021/0181362 | A1 * | 6/2021 | Jiang | G06K 9/6267 |
| 2021/0318457 | A1 * | 10/2021 | Zheng | G01V 1/50 |

OTHER PUBLICATIONS

Newman et al. "Enhanced Characterization of Induced Seismicity", Proceedings of the 42nd Workshop on Geothermal Reservoir Engineering, Feb. 13, 2017, pp. 1-20, https://pangea.stanford.edu/ERE/pdf/IGAstandard/SGW/2017/Newman.pdf.

Newman et al. Seismic Source Mechanism Estimation in 3D Elastic Media, Proceedings of the 43rd Workshop on Geothermal Reservoir Engineering, Feb. 12, 2018, pp. 1-9, https://pangea.stanford.edu/ERE/pdf/IGAstandard/SGW/2018/Newman.pdf.

Gajewski, D., et al., (2005) Reverse modeling for seismic event characterization: Geophysical Journal International, vol. 163, pp. 276-284. https://doi.om/10.IIII/j.1365-?46X.2005.02732.x.

Michel, Jarillo, O., et al. (2014) "Gradient calculation forwavefonn inversion of microseismic", data in VTI media: Journal of Seismic Exploration, vol. 23, pp. 201-217.

Petrov, P. V., et al., (2012) "3D finite-difference modeling of elastic wave propagation in the Laplace-Fourier domain", Geophysics, 77, No. 4, T137-TI55, https://doi .ond I0.I 190/geo20J 1-0238.1.

Petrov, P. V., et al., (2014) "Three-dimensional inverse modelling of damped elastic wave propagation in the Fourier domain", Geophysical Journal International, 198, I 599-1617, https://doi.org/10.1093/gji/ggu222.

Peterov, P. V., et al., (2017) "Waveform Inversion In Laplace-Fourier Domain For Estimation Of Seismic Event Location and Moment Tensor", SEG International Exposition and 87th Annual Meeting, pp. 1358-1363. https://doi.org/10.1190/segam2017-17664811.1.

Plessix, R. E., et al., (2010), "Application of acoustic full-waveform inversion to a low-frequency large-offset land data set", 80th Annual, I International Meeting, SEG, Expanded Abstracts, 930-934, https://doi.org/10.1 190/1.3513930.

* cited by examiner

MOMENT TENSOR RECONSTRUCTION

RELATED APPLICATIONS

This application is a U.S. national stage application of the PCT International Application No. PCT/US2018/051341, filed Sep. 17, 2018, which claims priority to U.S. Provisional Patent Application No. 62/561,502, filed Sep. 21, 2017, the entire contents of which are herein incorporated by reference.

STATEMENT OF GOVERNMENT RIGHTS

This invention was made with government support under Contract No. DE-AC02-05CH11231 awarded by the U.S. Department of Energy. The government has certain rights in the invention.

TECHNICAL FIELD

Implementations of the present disclosure relate to analytics of seismic activity

BACKGROUND

Seismic detectors may register movements of the earth generated by earthquakes and other seismic events. However, locating and determining the precise location and mechanism of an earthquake based on data received from seismic detectors may be difficult or impossible with some systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Seismic surveying and imaging methods generate three-dimensional models of seismic attributes of fault zones, geothermal sites, and oil or gas production fields. With increasing accuracy of three dimensional models, seismic detectors can estimate earthquake source locations and origins within a three dimensional model. Thus, actual positions and mechanisms of seismic events may be derived based on the waveforms recorded by seismic detectors. Accordingly, seismic events locations and source mechanisms may be shown for induced seismicity, small earthquakes, fracking processes, or other events by matching simulation results to observed data.

In some embodiments, a seismic monitoring system may use waveforms received from a plurality of seismic detectors to reconstruct the location and source mechanism of a seismic event. The seismic monitoring system may analyze waveforms received from the seismic detectors in the frequency domain to determine the source mechanisms of a seismic event. For example, in some embodiments, the seismic monitoring system may translate observed data to the Laplace-Fourier domain to reconstruct the mechanisms that generated the waveform.

In some embodiments, the seismic detectors may provide observed data for displacement, velocity, or acceleration at the seismic detector. The waveforms may then be translated to the frequency domain by the seismic processing system. After translation to the frequency domain, the seismic processing system may generate wave fields in a three dimensional seismic attribute model describing the elastic moduli and mass density of the geological area of interest. For example, the wave fields may be generated by applying the recorded waveforms as source inputs to the location of the seismic detectors in a three dimensional geological model.

In some embodiments, the simulation of each source is realized separately. For example, each source may be placed at a unique position determined by the seismic detectors. The input of the force for each source may be defined by a component force directed along the recorded velocity, displacement, or acceleration. After generation of the wave field, the seismic event location and mechanism may be determined by minimizing the residual errors between the recorded waveforms of the seismic detectors and the simulated sources. Accordingly, the seismic monitoring system may apply the reciprocity theorem to generate the source parameters based on the integral relation between the source parameters and the wave fields generated by the simulated sources from the observed data.

In some embodiments, the seismic monitoring system may generate the locations and source mechanisms of a seismic event by applying recorded waveforms in a three dimensional model of a geological medium. An example mathematical solution using the reciprocity theorem and Laplace-Fourier transformation of the recorded waveforms is described below. As described, the waveforms are based on a velocity measurement from a plurality of seismic detectors. However, a seismic monitoring system may use velocity, displacement, acceleration, or other waveforms, or a combination of multiple waveforms. In addition, other translations to frequency domain than a Laplace-Fourier transformation may be used.

In some embodiments, the elastic equations in the Laplace-Fourier domain may be obtained using a Laplace-Fourier transformation of the time-domain system for velocity and stress formulation. For example, the translations to the Laplace-Fourier domain may be given by the following equations:

$$s\bar{v} = \langle b \rangle \hat{D}_\tau \bar{\tau} + \bar{f}(\bar{x}), s\bar{\tau} = \langle \lambda\mu \rangle \hat{D}_v \bar{v} + s\bar{m}(\bar{x}),$$
$$\bar{v}=(v_x,v_y,v_z)^T, \bar{\tau}=(\tau_{xx},\tau_{xy},\tau_{xz},\tau_{yy},\tau_{yz},\tau_{zz})^T \quad \text{Equation (1)}$$

In Equation 1, $s=s_1+i\omega$ is the complex frequency (so is the Laplace damping parameter and $\omega$ is the angular frequency), $v_x$, $v_y$, $v_z$ are the velocity wave-field components, $\tau_{pq}$; p, q=x,y,z, are the six stress tensor components in the x, y, z dimensions, $f_x$, $f_y$, $f_z$ are body forces per unit volume, the symbols $\langle b \rangle D_\tau$, $\langle \lambda\mu \rangle D_v$ respectively denote the partial differential operators, which include reciprocal of mass density or buoyancy $b(r)=1/\rho(r)$, elastic moduli $\lambda(r)$, and $\mu(r)$ of the media and moment tensor density defined as $m(x)=(m_{xx}(x), m_{xy}(x), m_{xz}(x), m_{yy}(x), m_{yz}(x), m_{zz}(x))$.

By dividing the system of equations by complex frequency s, and rewriting to solve for the velocity, the following equation gives the velocity of the system.

$$BM = E; \quad \text{Equations (5)}$$

$$B = \begin{bmatrix} \frac{\partial v_x^1}{\partial x}; & \frac{\partial v_x^1}{\partial y} + \frac{\partial v_y^1}{\partial x}; & \frac{\partial v_x^1}{\partial z} + \frac{\partial v_z^1}{\partial x}; & \frac{\partial v_y^1}{\partial y}; & \frac{\partial v_z^1}{\partial y} + \frac{\partial v_y^1}{\partial z}; & \frac{\partial v_z^1}{\partial z} \\ \ldots & \ldots & \ldots & \ldots & \ldots & \ldots \\ \frac{\partial v_x^{N_d}}{\partial x}; & \frac{\partial v_x^{N_d}}{\partial y} + \frac{\partial v_y^{N_d}}{\partial x}; & \frac{\partial v_x^{N_d}}{\partial z} + \frac{\partial v_z^{N_d}}{\partial x}; & \frac{\partial v_y^{N_d}}{\partial y}; & \frac{\partial v_z^{N_d}}{\partial y} + \frac{\partial v_y^{N_d}}{\partial z}; & \frac{\partial v_z^{N_d}}{\partial z} \end{bmatrix}_{\bar{x}=\bar{x}_S};$$

$$M = (M_{xx}^s, M_{xy}^s, M_{xz}^s, M_{yy}^s, M_{yz}^s, M_{zz}^s)^T; E = (\underbrace{1 \ 1 \ \ldots \ 1}_{N_d})^T;$$

$$\bar{v} = A^{-1}(\bar{f}/s + \langle b \rangle \hat{D}_r^s \bar{m}), \quad \text{Equations (2)}$$

$$A = (I - \langle b \rangle \hat{D}_r^s \langle \lambda \mu \rangle \hat{D}_v^s)$$

As discussed above, the seismic monitoring system may use the reciprocity theorem to determine the location and source mechanism of a seismic event. Applying the reciprocity theorem to the velocity equation in Equation 2 provides the following integral expression:

$$\int dV(m_{ij}^S \partial_j v_i^R - m_{ij}^R \partial_j v_i^S - f_i^R v_i^S + f_i^S v_i^R) = 0 \quad \text{Equation (3)}$$

In Equation 3, $m_{ij}^S(S)$, $f_i^S(S)$ represent the moment tensor density and force at the source position 'S' and $m_{ij}^R(R)$, $f_i^R(R)$ at the receiver position 'R', respectively. Furthermore, $v_i^S(R)$ represents the velocity component (i=x,y or z) in the receiver position 'R' generated by the source at point 'S' and $v_i^R(S)$ represents the velocity component in the position 'S' generated by the source at point 'R'.

Setting $m_{ij}^R(R)$ and $f_i^S(S)$ to zero by choice and expanding Equation 3 in terms for all velocity, moment tensor and force components yields $$\int dV \left( \sum_{i=x,y,z} \sum_{j=x,y,z} (m_{ij}^s(S) \partial_j v_i^R(S) - f_i^R(R) v_i^S(R)) \right) = \quad \text{Equation (4)}$$

$$\int dV(m_{xx}^S(S) \partial_x v_x^R(S) + m_{yy}^S(S) \partial_y v_y^R(S) +$$
$$m_{zz}^S(S) \partial_z v_z^R(S) + m_{xz}^S(S)(\partial_z v_x^R(S) + \partial_x v_z^R(S)) +$$
$$m_{xy}^S(S)(\partial_y v_x^R(S) + \partial_x v_y^R(S)) + m_{yz}^S(S)(\partial_y v_z^R(S) + \partial_z v_y^R(S)) -$$
$$f_x^R(R) v_x^S(R) - f_y^R(R) v_y^S(R) - f_z^R(R) v_z^S(R)) = 0$$

In order to simplify the equation for multiple receivers, the seismic monitoring system may generate a virtual source at each location of a seismic detector for each measured direction. For instance, if a seismic detector measures velocity in an x, y, and z direction, the seismic monitoring system may generate three virtual sources at the location of the seismic detector with each representing a different direction.

Moreover, because $m_{ij}^S(S)$ and $f_i^R(R)$ (i,j=x,y or z) are assumed point sources, integration of Equation 4 can be carried out using Dirac delta-functions over the volume of the three dimensional seismic attribute model of the medium, resulting in the following matrix equation:

In Equation 5, the velocity components are sourced by the reciprocal of the measured velocity field at the receivers and define the location of a possible moment tensor source point. Here $N_d$ is the total number of measured data for all components at all the detectors. Because of the unique existence of the locations and moment tensor of the seismic event, there is an optimize point where the Equation 5 holds true. Accordingly, the location and moment tensor for a seismic event may be established by searching each position in the three dimensional model to determine a location where the relationship in Equation 5 is satisfied.

In a practical system, a seismic monitoring system may begin with setting a three dimensional seismic attribute model of a geological medium along with positions of detectors in the three dimensional model. Based on the received waveforms from the seismic detectors, a seismic monitoring system may calculate each velocity component in the medium for each measured velocity component utilizing an adjoint state method as follows:

$$\nabla_k^{r_p} = (A^T)^{-1} f_p^k f_p^k = 1/v^k(\bar{x}_{r_p}) \quad \text{Equation (6)}$$

Then for each point of the three dimensional geological model, the velocity derivatives may be calculated. For example, the velocity derivatives may be the elements of matrix B described with reference to Equation (5). For each point in the three dimensional model, the moment tensor may be evaluated by solving the normal equation generated from Equation 5 as shown below:

$$M(\bar{x}) = \left( B^T(\bar{x}) B(\bar{x}) \right)^{-1} B^T(\bar{x}) e, \quad \text{Equation (7)}$$

$$e = (e_1, K, e_{N_d})^T, e_l = 1,$$

$$B(\bar{x}) = \left( b_{l,1}(\bar{x}) \ b_{l,2}(\bar{x}) \ b_{l,3}(\bar{x}) \ b_{l,4}(\bar{x}) \ b_{l,5}(\bar{x}) \ b_{l,6}(\bar{x}) \right),$$

$$l = 1 \ldots N_d$$

A vector q may be defined as the construction of the objective function based on Equation (7). Accordingly, a source position may be determined by a search of positions within the three dimensional model that satisfy Q(x)=1, where Q(x) is defined as:

$$q(\vec{x}) = BM(\vec{x})$$ Equation (8)

$$Q(\vec{x}) = \left| \prod_{l=1}^{N_d} q_l(\vec{x}) \right|$$

After possible positions of the seismic event are established, the moment tensor of the source mechanism at the correct position may be defined which satisfies Equation (8) within acceptable measurement errors of the recorded data. For instance, the moment tensor may be given by:

$$M\left(\vec{x}_s^r\right) = \left(B^T\left(\vec{x}_s^r\right)B\left(\vec{x}_s^r\right)\right)^{-1} B^T\left(\vec{x}_s^r\right)e$$ Equation (9)

Accordingly, in some embodiments, a seismic monitoring system may receive recordings of waveforms from a number of seismic detectors at different locations in a geological system. The monitoring system may then apply the waveforms as inputs to the position of each seismic detector in a three dimensional model of the geological system. Based on the input, the seismic monitoring system may treat each detector as a source with the respective waveform to generate a wave field in the model. The seismic monitoring system may then search potential positions within the model to determine possible locations of the seismic event. The moment tensor may be established based on the correct location by the solution to the equations described above.

Particular equations are described above to describe example mathematical calculations that may be performed in some embodiments of a seismic monitoring system. However, in some embodiments different mathematical calculations may be performed. For example, in different configurations, there may be different equations optimized. However, in various embodiments, a seismic monitoring system may use waveform recordings from seismic detectors to act as sources within a three dimensional model of a geological medium using different calculations than described above.

The application of waveforms to seismic detectors modeled as sources within a model of a geological medium may have a number of applications. For example, the estimated positions and source mechanisms may provide additional information to the energy industry, seismologists, and the like. For example, in processes to break rock and release natural gas, it may be important to know what kinds of fractures are generated by a fracturing process. Providing additional information about the fractures that are formed may increase longevity and production of the systems.

In some embodiments, the seismic monitoring system may be used to determine how to stress or break rock to create a heat exchange. For example, stressing rock to create a fracture may release heat in a geothermal process. By creating heat exchange with the geothermal fractures, a system may provide heat to generate electricity or other energy through a heat exchange. Accordingly, determining the position and moment tensor as described herein may improve the creation of geothermal energy production heat exchanges.

Furthermore, the locations and source mechanisms determined by the seismic monitoring system may be used to better understand and predict how natural systems will responds to stress. Accordingly, additional manmade or natural phenomenon may be tested against a model to determine how a system will react.

Additionally, the estimations generated by the seismic monitoring system may be used to plan positioning of seismic detectors in new geological mediums. For example, if a new fracturing system is to be developed, rather than placing seismic detectors in an ad hoc manner near an estimated fracturing site, the seismic monitoring system can test various positions. Thus, with a simulated fracturing event, the seismic monitoring system may simulate the response of seismic detectors. By applying noise to the model, the seismic monitoring system may determine how much error is added to the calculated locations and moment tensors. By testing a number of seismic detector locations, the seismic monitoring system may determine optimized positions for deployment of the seismic detectors in a real deployment to improve accuracy and resilience to noise in the system.

Figure 1:
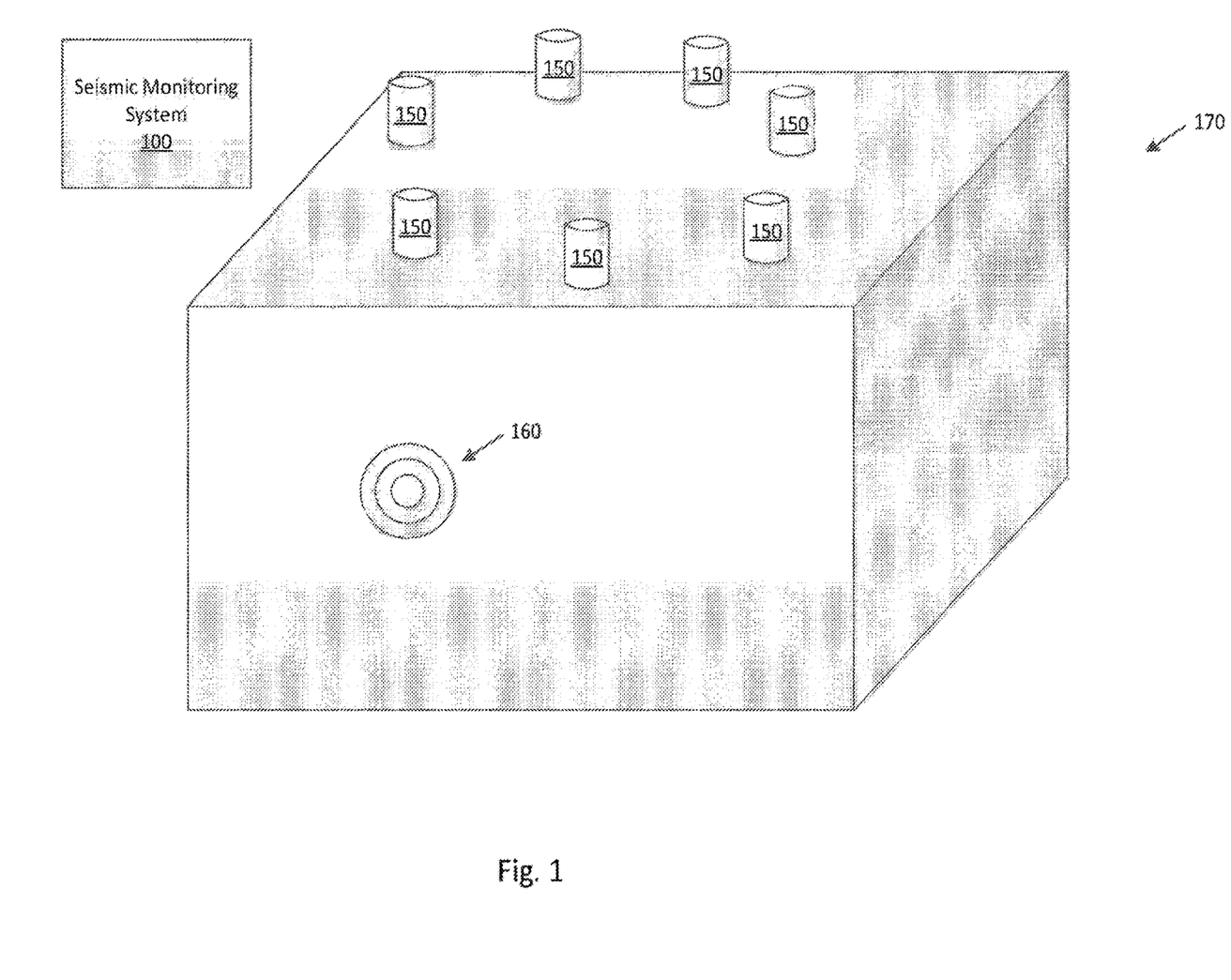
FIG. 1 is a schematic diagram of an embodiment of a seismic monitoring system, which can be used in accordance with some embodiments.

FIG. 1 depicts a deployment of a seismic monitoring system in a geological medium 170. FIG. 1 includes a seismic monitoring system 100, a number of seismic detectors 150, and a location of a seismic event 160 within the geological medium 170. The geological medium 170 may be a section of a portion of a geological area. For example, the geological medium 170 may be a field of expected seismic activity such as an area of intended fracturing for releasing gas or creating a heat transfer, an area of regular seismic activity, or another area of interest.

The seismic detectors 150 may be any type of seismic detectors that can detect motion due to a seismic event. The seismic detectors 150 may provide an indication of motion in one or more directions as registered at the seismic detectors 150. For example, the seismic detectors 150 may determine displacement, velocity, acceleration, or another indication of seismic activity at the position of the seismic detector 150. In some embodiments, the seismic detectors 150 may transmit data based on seismic activities to the seismic monitoring system 100. For example, the seismic detectors may be operatively coupled to the seismic monitoring system 100 via a wired or wireless network connection.

As shown in FIG. 1, a seismic event 160 may cause waves to propagate through the geological medium 170. For example, the seismic event 160 may cause waves to propagate that are registered as waveforms at seismic detectors 150. The seismic event 160 may be a fracture in the geographic medium, an earthquake, or another seismological event. The seismic monitoring system 100 may be operatively coupled to the seismic detectors 100 to determine a location of the seismic event 160 in the geological medium 170.

Figure 2:
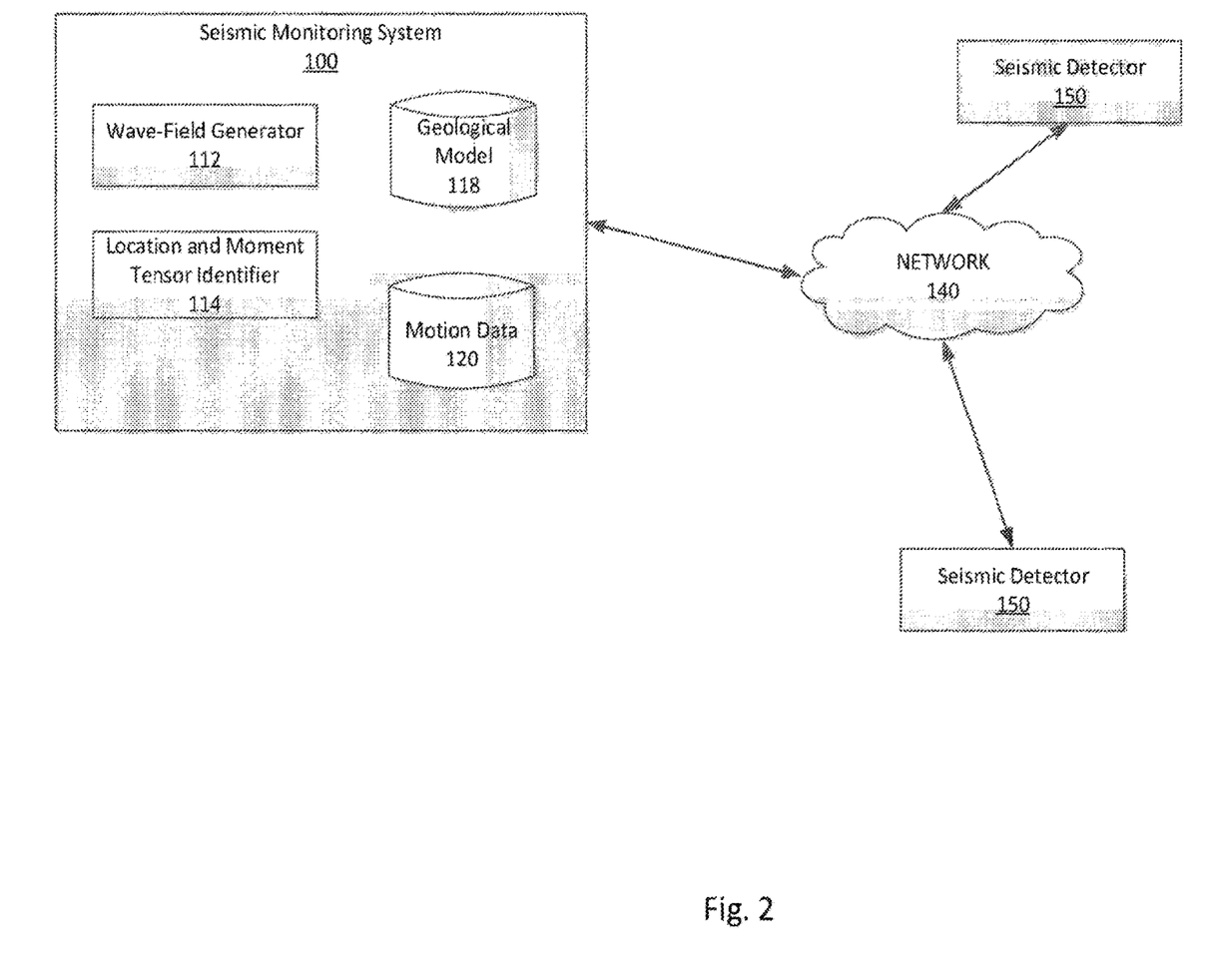
FIG. 2 is a schematic diagram of an embodiment of a seismic monitoring system, which can be used in accordance with some embodiments.

FIG. 2 depicts a schematic of a seismic monitoring system 100 that interacts with seismic detectors 150 to determine a location of a seismic event. For example, the seismic event may be the seismic event 160 in geological medium 170 as described with reference to FIG. 1. Seismic detectors 150 may be connected to a seismic monitoring system 100 through a network 140. The network 140 may be a wired or wireless connection, and may include a local area network (LAN), a wide area network, an intranet, an extranet, the internet, or some other networked connection. In some embodiments, the seismic detectors 150 may be connected to a central hub that connects to the seismic monitoring system 100 through network 140.

The seismic monitoring system 100 may include a wavefield generator 112 and a location and moment tensor identifier 114 that use a geological seismic attribute model 118 and motion data 120 to determine a location and source mechanism of a seismic event. The geological seismic attribute model 118 may be a three-dimensional model of the elastic moduli and mass density of the medium associated with a location having a plurality of seismic detectors 150 associated with the location. For instance, the seismic detectors 150 may be positioned near a point of geological interest. The model may describe elastic properties of different portions of the geological medium. In some embodiments, the geological seismic attribute model 118 may be a three dimensional model of a medium that represents the properties of the medium that relate to the propagation of seismic waveforms through the Medium.

Motion data 120 may describe the velocity, displacement, or acceleration of a seismic detector 150 over time. In some embodiments the motion data may be received from the seismic detectors 150. Although two seismic detectors 150 are shown in FIG. 2, in some embodiments, there may be fewer or additional seismic detectors. For example, in some embodiments there may be 8-12 seismic detectors 150 in an area of interest. The motion data 120 may be generated based on waveforms received from the seismic detectors 150. For example, in some embodiments, the motion data may include an indication of velocity in three dimensions at each of the seismic detectors 150. In some embodiments, the waveforms received from seismic detectors 150 may be stored as separate waveforms for each dimension of motion.

In some embodiments, the wave-field generator 112 may use the motion data 120 and the geological seismic attribute model 118 to generate a wave-field representing the movement of waves in the geological seismic attribute model 118. For example, the wave-field generator 112 may apply each waveform stored in motion data 120 as an input to a position in the geological seismic attribute model 118 that corresponds to a physical position of a seismic detector 150. Accordingly, each seismic detector 150 may act as a virtual source within the geological seismic attribute model 118 to generate a wave-field within the geological seismic attribute model 118. In some embodiments, the wave-field generator 112 may apply multiple waveforms at the position of each seismic detector 150 for each of the measured directions for which movement data was received (e.g., a waveform for each direction in three dimensional space).

After a wave-field has been generated by the wave-field generator 112, the location and moment tensor identifier 114 may determine a location of a seismic event. In some embodiments, the location and moment tensor identifier 114 may perform a search of positions within the geographic model 118 by testing each position and determining whether the reciprocity theorem is satisfied. For example, the location and moment tensor identifier 114 may determine a minimization of equation 8 as described above.

After the location of the seismic event is identified based on testing positions in a geographic model using the generated wave-field, the location an moment tensor identifier 114 may determine the moment tensor representing the source mechanism of the seismic event. For example, in some embodiments, the location and moment tensor identifier 114 may generate a representation of the source mechanism from equation 9 as described above.

The location and moment tensor generated by the seismic monitoring system 100 may be used to determine whether appropriate fracturing has occurred for gas production, creating a heat exchange, or other uses. In some embodiments, the location and moment tensor may also be used to further analyze the geographic area represented by geographic model 118. For example, the location and moment tensor may provide additional insight into potential future developments of the geological area due to manmade or natural events.

Figure 3:
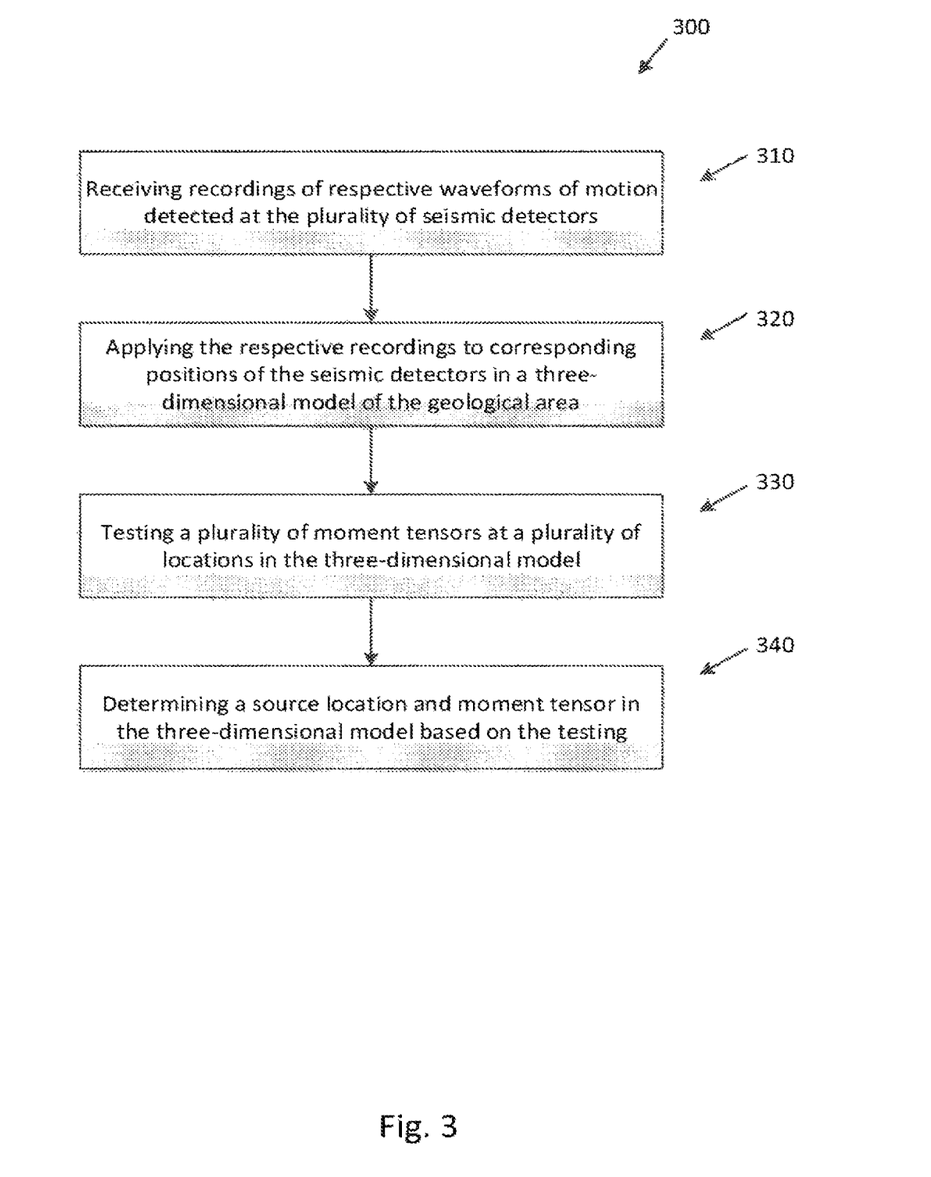
FIG. 3 is a flow diagram of an embodiment of a method of determining a feedback response based on log data in accordance with some embodiments.

FIG. 3 is a flow chart 300 illustrating example operations of a seismic monitoring system. For example, the processes described with reference to FIG. 3 may be applied by a seismic monitoring system 100 as described with reference to FIGS. 1 and 2. Beginning in block 310, the seismic monitoring system may receive recordings of waveforms from a number of seismic detectors. In some embodiments, the seismic monitoring system may receive waveforms representing displacement, velocity, or acceleration of the seismic detectors in one or more dimension. For example, each seismic detector may provide waveforms representing motion in one or more dimensions of three dimensional space.

In block 320, the seismic monitoring system may apply the recordings of waveforms to positions of the seismic detectors in a three dimensional model of the geological area where the detectors are placed. In some embodiments, applying the waveforms includes defining three dimensional elastic properties of the geological medium of interest. For example, a three dimensional model of the geological area where the detectors are placed may be received by the seismic monitoring system. In some embodiments, the recordings may then be translated from the recorded time domain to a frequency domain. For example, each recorded waveform for each seismic detector may be transformed using a Laplace-Fourier transformation to the frequency domain. The seismic monitoring system may then generate virtual sources within the three dimensional model of the geological medium at the positions of each of the detectors. The virtual sources may use the frequency domain representations of the recorded waveforms as inputs. The seismic monitoring system may then back propagate the waveforms at the position of each detector to generate a wave-field within the three dimensional model.

In block 330, the seismic monitoring system may test a plurality of moment tensors at a plurality of locations within the three dimensional model of the geological area. For example, in some embodiments, the seismic monitoring system may perform an exhaustive search of each location in the geological model. The seismic monitoring system may search for a location that minimized equation 8 as described above.

In block 340, the seismic monitoring system may determine a source location and a moment tensor in the three dimensional model based on the testing performed in block 330. For example, following the exhaustive search, candidate positions within the three dimensional model may minimize Equation 8 as described above. Accordingly, the positions associated with the minimized error of Equation 8 may be identified by the seismic monitoring system as the candidate location of the source mechanism for the recorded seismic event. The seismic monitoring system may further identify the correct position and its moment tensor representing the source mechanism using Equation 9 and selecting the solution with the minimum residual at the identified position.

Figure 4:
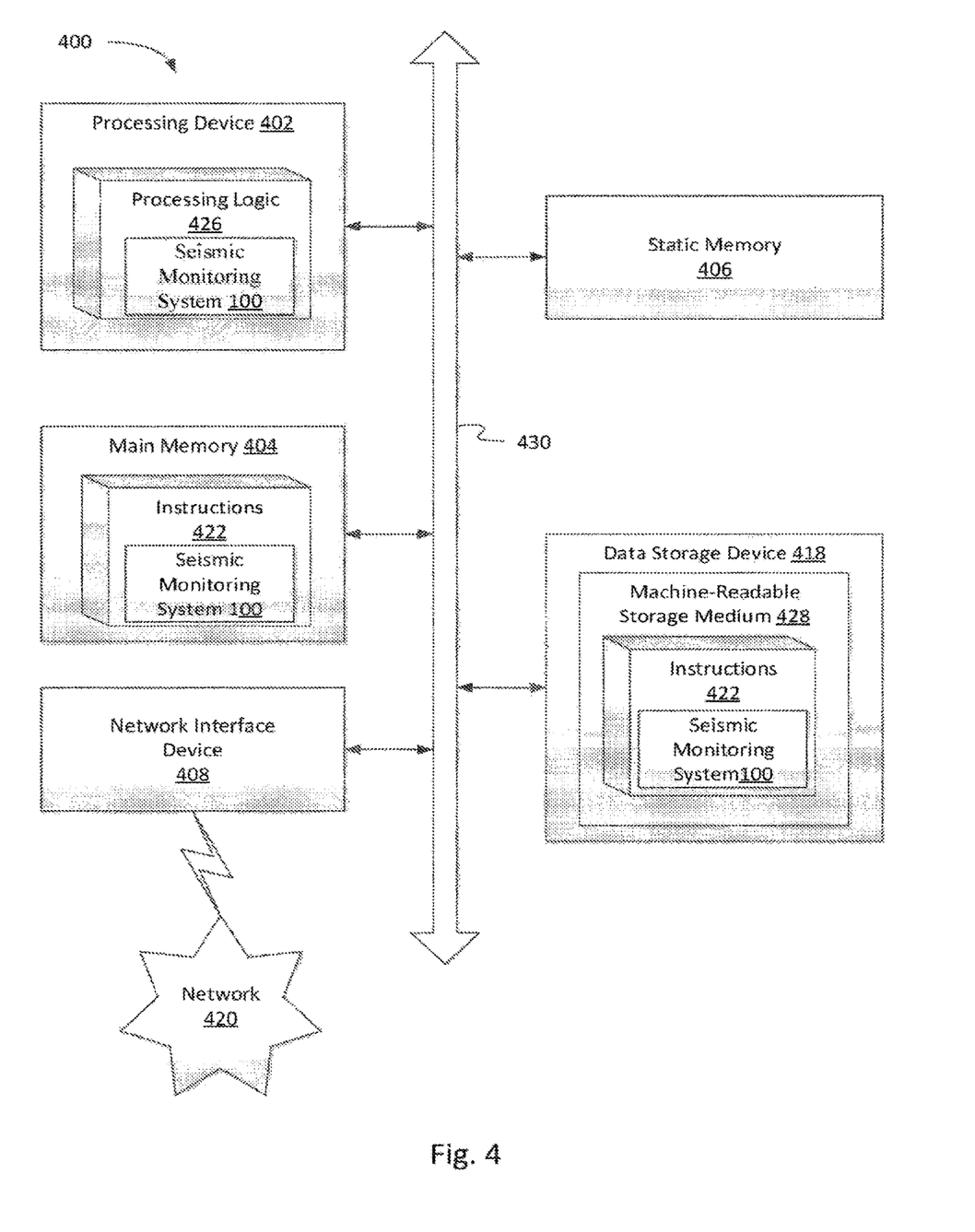
FIG. 4 is an illustration showing an example computing device which may implement the embodiments described herein.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 400 may be representative of a server computer system, such as seismic monitoring system 100 configured to analyze log data of networked devices.

The exemplary computer system 400 includes a processing device 402, a main memory 404 (e.g., read-only memory (ROM), flash memory, dynamic random access memory (DRAM), a static memory 406 (e.g., flash memory, static random access memory (SRAM), etc.), and a data storage device 418, which communicate with each other via a bus 430. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute processing logic 426, which may be one example of system 400 shown in FIG. 4, for performing the operations and steps discussed herein.

The data storage device 418 may include a machine-readable storage medium 428, on which is stored one or more set of instructions 422 (e.g., software) embodying any one or more of the methodologies of functions described herein, including instructions to cause the processing device 402 to execute seismic monitoring system 100. The instructions 422 may also reside, completely or at least partially, within the main memory 404 or within the processing device 402 during execution thereof by the computer system 400; the main memory 404 and the processing device 402 also constituting machine-readable storage media. The instructions 422 may further be transmitted or received over a network 420 via the network interface device 408.

The machine-readable storage medium 428 may also be used to store instructions to perform a method for analyzing log data received from networked devices, as described herein. While the machine-readable storage medium 428 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances: In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A seismic monitoring system comprising:
a plurality of seismic detectors; and
a processing device operatively coupled to the plurality of seismic detectors, wherein the processing device is to:
receive, from the plurality of seismic detectors, recordings of respective waveforms of motion detected at the plurality of seismic detectors in a geological area;
receive a three-dimensional seismic attribute model of a geological medium at the geological area;
apply the respective recordings to corresponding positions of the seismic detectors in the three-dimensional model;
test a plurality of moment tensors at a plurality of locations in the three-dimensional model to determine whether a location within the plurality of locations in the three-dimensional model satisfies $Q(\vec{x})=1$,
wherein $$Q(\vec{x}) = \left| \sum_{l=1}^{N_d} q_l(\vec{x}) \right|$$

wherein $N_d$ is a total number of components of the respective recordings of the plurality of moment tensors, and
wherein $q_1(\vec{x})$ is a vector based on respective velocity derivatives for each of the locations of the plurality of locations in the three-dimensional model; and
determine a globally convergent source location and moment tensor in the three-dimensional model based on the testing.

2. The system of claim 1, wherein to apply the respective recordings, the processing device is further to:
transform the respective recordings to a frequency domain to generate transformation data; and
provide the transformation data as virtual sources at the corresponding positions of the seismic detectors in the three-dimensional model.

3. The system of claim 1, wherein to apply the respective recordings, the processing device is further to back propagate the recordings of the respective waveforms to generate a wave-field in the three-dimensional model.

4. The system of claim 1, wherein the three-dimensional model of the geological medium at the location defines elastic properties of the geological medium.

5. The system of claim 1, wherein to test the plurality of moment tensors at the plurality of locations, the processing device is further to estimate point source earthquake mechanisms at each point in the geological medium.

6. The system of claim 1, wherein the recordings of the respective waveforms comprise displacements, velocity, or acceleration data of a sensor of the seismic detectors.

7. The system of claim 1, wherein the seismic detectors are deployed around the geological area to measure an effect of fracturing mechanisms in the geological area.

8. He system of claim 1, wherein the determined location is globally unique based on the waveforms received from the plurality of seismic detectors.

9. A method comprising:
receiving waveforms of motion detected at a plurality of seismic detectors in a geological area;
receive a three-dimensional seismic attribute model of a geological medium at the geological area;
transforming the received waveforms to a frequency domain;
applying frequency domain representations of the waveforms at corresponding positions of the seismic detectors in three-dimensional model of the geological area;
testing a plurality of moment tensors at a plurality of locations in the three-dimensional model to determine whether a location within the plurality of locations in the three-dimensional model satisfies $Q(\vec{x})=1$,
wherein $$Q(\vec{x}) = \left| \sum_{l=1}^{N_d} q_l(\vec{x}) \right|$$

wherein $N_d$ is a total number of components of the received waveforms of the plurality of moment tensors, and
wherein $q_1(\vec{x})$ is a vector based on respective velocity derivatives for each of the locations of the plurality of locations in the three-dimensional model; and
determining a globally convergent source location and moment tensor in the three-dimensional model based on the testing.

10. The method of claim 9, wherein testing the plurality of moment tensors at the plurality of locations comprises estimating point source earthquake mechanisms at each point in the geological medium.

11. The method of claim 9, wherein applying the frequency domain representations of the waveforms comprises back propagating the received waveforms to generate a wave-field in the three-dimensional model.

12. The method of claim 9, wherein the three-dimensional model of the geological medium at the location defines elastic properties of the geological medium.

13. The method of claim 9, wherein the received waveforms comprise displacements, velocity, or acceleration data of a sensor of the seismic detectors.

14. A seismic monitor comprising:
a memory device; and
a processing device operatively coupled to the memory device, the processing device to:

receive, from a plurality of seismic detectors, recordings of respective waveforms of motion detected at the plurality of seismic detectors in a geological area of interest;

receive a three-dimensional model of a geological medium at the geological area;

apply the respective recordings to corresponding positions of the seismic detectors in the three-dimensional model;

test a plurality of moment tensors at a plurality of locations in the three-dimensional model to determine whether a location within the plurality of locations in the three-dimensional model satisfies $Q(\vec{x})=1$, wherein $$Q(\vec{x}) = \left| \sum_{l=1}^{N_d} q_l(\vec{x}) \right|$$

wherein $N_d$ is a total number of components of the respective recordings of the plurality of moment tensors, and wherein $q_1(\vec{x})$ is a vector based on respective velocity derivatives for each of the locations of the plurality of locations in the three-dimensional model; and determine a globally convergent source location and moment tensor in the three-dimensional model based on the testing.

15. The seismic monitor of claim 14, wherein to apply the respective recordings, the processing device is further to:
transform the respective recordings to a frequency domain to generate transformation data; and
provide the transformation data as virtual sources at the corresponding positions of the seismic detectors in the three-dimensional model.

16. The seismic monitor of claim 14, wherein to apply the respective recordings, the processing device is further to back propagate the recordings of the respective waveforms to generate a wave-field in the three-dimensional model.

17. The seismic monitor of claim 14, wherein the three-dimensional model of the geological medium at the location defines elastic properties of the geological medium.

18. The seismic monitor of claim 14, wherein to test the plurality of moment tensors at the plurality of locations, the processing device is further to estimate point source earthquake mechanisms at each point in the geological medium.

19. The seismic monitor of claim 14, wherein the recordings of the respective waveforms comprise displacements, velocity, or acceleration data of a sensor of the seismic detectors.

* * * * *